Jan. 28, 1964     M. N. JANAPOL     3,119,728
LABEL PRESSING MACHINE
Filed July 7, 1958
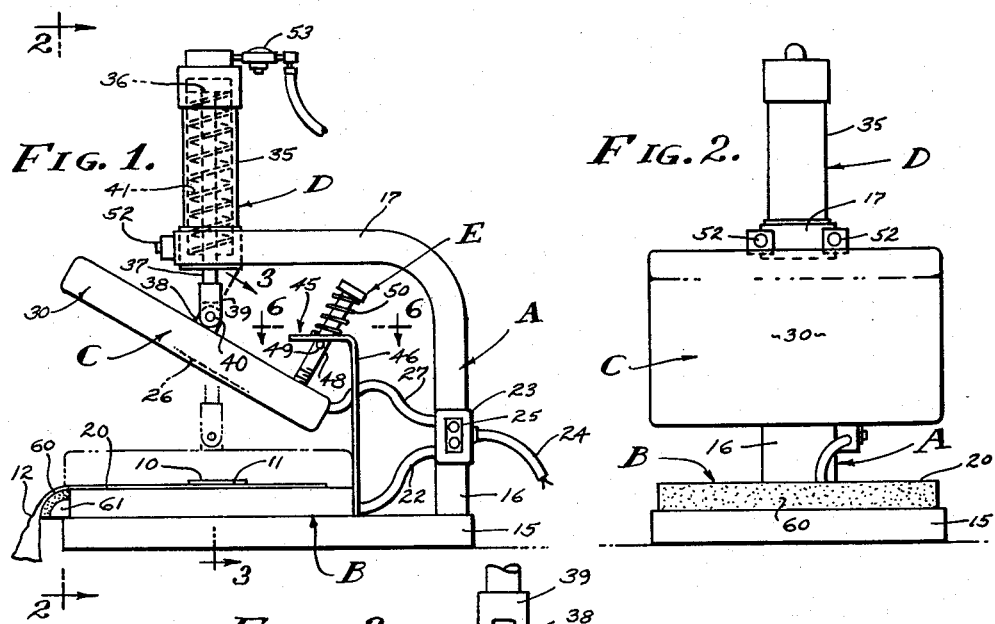
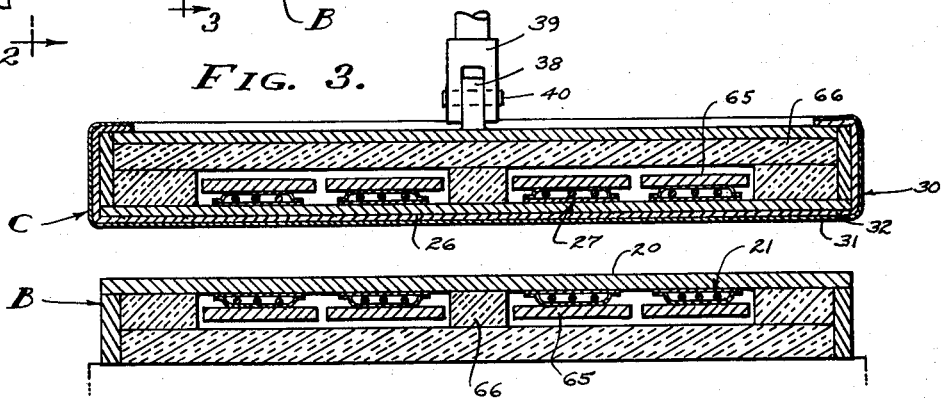
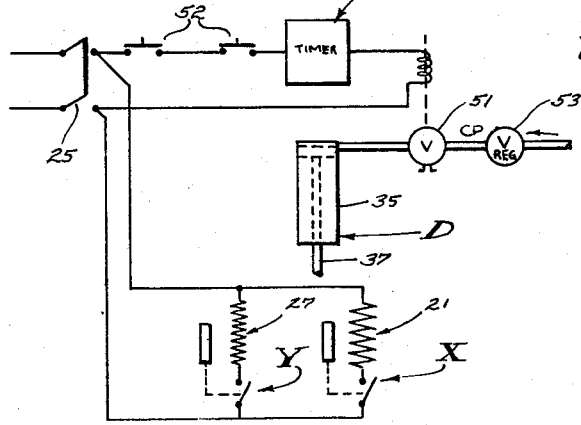
INVENTOR
MELVIN N. JANAPOL
BY
W. H. Maxwell
AGENT 3,119,728
LABEL PRESSING MACHINE
Melvin N. Janapol, Los Angeles, Calif., assignor, by mesne assignments, to Wortso Corporation, Los Angeles, Calif., a corporation of California
Filed July 7, 1958, Ser. No. 747,038
3 Claims. (Cl. 156—583)

The present invention relates to the installation of labels upon fabric, and the like, and is particularly concerned with a hot pressing apparatus that is adapted to apply labels to panels of fabric under pressure and in the presence of heat, it being a general object of this invention to provide a commercially practical device of the character referred to that facilitates the application of labels and so that they are applied in a uniform and reliable manner.

In the manufacture of articles made of fabric, or the like, it is the common practice to apply labels in order to name and advertise the particular article involved. Said labels have been standardized and are referred to as "hot process labels," and, for example, involve a facing of material with an underlying film of gutta-percha coextensive therewith for anchoring contact with the fabric article to be labeled. The material forming the facing can vary widely and the gutta-percha acts as a bond between the facing and the fabric article.

The common ordinary application of labels of the type above referred to involves the use of an iron that is manually employed to apply both heat and pressure. Although manual ironing is widely employed, it is not altogether satisfactory since human skill and error controls the proper and successful application of the labels. Further, said ironing is quite slow. In practice, too little heat and pressure results in a poor bond, whereas too much heat and/or pressure results in either overrunning of the gutta-percha or scorching of the facing. It is, therefore, obvious that the exact application of the correct amount of heat and pressure is much to be desired in the application of "hot process labels."

An object of this invention is to provide a machine for installing labels that applies both the correct amount of heat and pressure. With the machine that I provide the level of heat is controlled and remains substantially constant and the amount of pressure is the same for each successive cycle of operation.

It is an object of this invention to provide a machine for installing labels that selectively applies the desired amount of heat and pressure. With the machine that I provide the heat level is manually adjustable to remain at the desired level and the amount of pressure is also manually adjustable and so that said selected heat and pressure is repeatedly applied for each successive operation.

Another object of this invention is to provide a pressing machine that applies heat in a manner to draw the bonding material so that it flows in the desired direction. With the type of label involved the bonding material is initially adhered to the label facing and it is then desirable to simply anchor it into the panel upon which the label is installed. With the present invention there is a differential in heat applied at the opposed elements to the end that the bonding material flows into the fabric panel and not into the facing.

It is still another object of this invention to provide a machine of the character referred to that is controlled so as to be safe to operate and which involves timing means so that each cycle of operation is of the same effect.

The various objects and features of my invention will be fully understood from the following detailed description of a typical preferred form and application of my invention, throughout which description reference is made to the accompanying drawings, in which:

FIG. 1 is a side elevational view of the machine of the present invention, showing the platen thereof lifted to a normally unactuated position for the reception of a panel of material and a label to be installed thereon. FIG. 2 is a front view taken as indicated by line 2—2 on FIG. 1. FIG. 3 is an enlarged sectional view taken substantially as indicated by line 3—3 on FIG. 1. FIG. 4 is a diagram of a typical wiring of the machine shown throughout the drawings. FIG. 5 is an enlarged diagrammatic view of the cross section of materials involved in application of a label to a panel of fabric, and FIG. 6 is an enlarged detailed view of a portion of the machine and taken as indicated by line 6—6 on FIG. 1.

The machine of the present invention is provided to install or apply one element to another by the process of ironing. Although many different kinds of elements can be applied to others in this manner, the particular problem involved has to do with the application of a specific type of element, namely, a "hot process label" to a general type of base element, namely, a panel of fabric. Said "hot process labels" vary widely in size and in the kind of facing 10 employed. For the most part, however, the facing 10 is a quality fabric that is highly decorative and which has woven therein suitable design ornamentation and advertizing media, etc. Appealing colors are employed in decorating the facing, the lighter and delicate, and unstable colors being adversely affected by too much heat and by soiling with foreign substances.

The "hot process labels" (see FIG. 5) are adapted to be anchored by means of an underlying film 11 of bonding material that reacts to thermal conditions in order to bond the facing 10 to the front surface of a panel of fabric 12, or the like. The film 10 may vary in form and composition and is generally made of gutta-percha, or a like substance, that reacts to heat in a manner to flow and adhere to any object contacted thereby. Said gutta-percha film 11 is particularly adapted to adhere to fabrics by flowing, under the influence of heat and pressure, into the interstices of the fabric. That is, the film 11 is softened and made fluid by the application of heat and is caused to enter into the construction of the fabric 12 by means of pressure.

The panel 12 of fabric, or the like, may be of any size and shape and of any desired fineness or quality. It is not necessary that the panel 12 be a woven panel; however, a woven panel 12 is commonly employed and is particularly suited to receive labels of the type under consideration. Therefore, I have illustrated a panel 12 that is woven and which has a multiplicity of interstices therein. It will be apparent how the film 11 effectively anchors the facing 10 to the panel 11 when it is caused to flow into the interstices for anchoring engagement.

In accordance with the invention, I have provided a machine or apparatus that is particularly adapted to apply or install labels of the type hereinabove referred to, and which involves, generally, a frame A, a presser plate B, a platen C, operating means D to move the platen relative to the plate, and positioning means E to control movement of the platen relative to the plate. The frame A is the main supporting structure for the elements involved. The presser plate B and platen C are heated elements adapted to be moved into pressured engagement with each other, and the means D and E act to apply said pressure and act to determine the relative position between the said elements, as latter described. Further, the invention involves temperature controlling means X and Y for the presser plate B and platen C, respectively, and also involves timing means Z for controlling actuation of the machine.

The frame A that supports the elements involved in the machine is an erect structure having a base 15 for supporting engagement with a bench or stand, and a standard 16. The base is a flat horizontally disposed element and the standard 16 projects upwardly and vertically at the back side of the base and carries a horizontal arm 17 that overlies the top of the base. The standard 16 and arm 17 are rigid with each other and with the base 15, the arm 17 terminating in an end portion positioned centrally of and opposing the base.

The presser plate B is fixedly carried by the base 15 of the frame A and is a flat horizontally disposed element that overlies the base to be substantially coextensive therewith. In practice, the presser plate B is a metal plate with a smooth top 20 and it has heating elements 21 imbedded therein, preferably electrical heating elements that lie in a fashion to uniformly heat the entire top 20, as later described. As shown, electrical leads 22 extend from the elements 21 to a junction box 23. A power line 24 supplies the junction box 23 there being a suitable on and off switch 25 to control flow of current from the power line.

The platen C is shiftably carried by the arm 17 and is a flat element that is normally angularly related to the presser plate B and which is shiftable downwardly and into flat face to face engagement with the presser plate B. The platen is supported by elements of the means D later described and is angularly shifted by the means E. In practice, the platen C is a metal plate with a smooth bottom 25 and it has heating elements 27 imbedded therein, preferably electrical heating elements that lie in a fashion to uniformly heat the entire bottom 26, as later described. As shown, electrical leads 28 extend from the elements 27 to the junction box 23, said leads being flexible. In accordance with the invention, the junction box 23 is positioned on the standard 16 adjacent the rear edge of the presser plate B and platen C, the leads 22 and 28 extending between said rear edges of these two elements and the box 23.

In the drawings I have shown the platen C as being provided with a cover 30 that is padded and which is shaped so as to underlie the bottom 26. The cover 30 may be of muslin or cotton fabric 31 padded with a resilient cushion 32 of cotton wadding, or the like.

In order to retain a panel 12 of fabric, or the like, in place on the top 20 of the presser plate B, I provide a friction means that is adapted to grip and hold the panel 12 in place when it is positioned as desired. In FIGS. 1 and 2 of the drawings I illustrate a lip 60 that projects from the front edge of the presser plate B. Since the usual panel 12 is pliant and flexible, the lip 60 is shaped to allow the panel to lie flat on the top 20 and have a portion depending from the front of the machine. Therefore, the lip is an elongate element that is coextensive with the front edge of the presser plate B and it extends forwardly from the top 20 and is curved downwardly. The lip has a frictional surface and is preferably formed of a soft non-inflammable foamed plastic material held in shape by a backing 61. The surface of the lip 60 is composed of a multiplicity of cells that are exposed, as by a cutting operation, presenting a roughened surface. A panel 12 of fabric engages the roughened surface of said plastic material and will not slip.

The operating means D that is provided to move the platen C relative to the presser plate B is adapted to bring the platen and the plate into pressured engagement with each other. As pointed out above, the operating means D supports the platen C and it operates to move the platen vertically into and out of engagement with the presser plate. In the preferred form of the invention the operating means D is a cylinder and piston mechanism that involves a cylinder 35, a piston 36, and a piston rod 37. The cylinder 35 is carried at the terminal end portion of the arm 17 with its axis vertically disposed and normal to the top of the presser plate B. The cylinder 35 slidably carries the piston 36 and rod 37 to reciprocate along the central vertical axis thereof, and the rod 37 projects from the lower end of the cylinder to have connection with and supporting engagement with the platen C. A central lug 38 projects upwardly from the top of the platen C and there is a coupling 39 at the lower end of the rod 37 connected to the lug by a pivot 40. The pivot 40 is on a horizontal axis that extends transversely so that the platen C is balanced and enabled to rock from the angular position shown in full lines to the horizontal position shown in phantom lines (see FIG. 1).

The operating means D, as it is illustrated, is actuated by fluid under pressure applied to the upper end of the cylinder 35 and which acts upon the piston 36 to yieldingly urge the platen C into pressured engagement with the presser plate B. A compression spring 41 is shown carried in the cylinder 35 between the lower end thereof and the piston 36 to lift the piston and rod and platen to a normally unactuated position when the fluid pressure is exhausted from the upper end of the cylinder 35. However, it is to be understood that the cylinder and piston mechanism may be of the double acting type, in which case the spring 41 would not be used.

The positioning means E provided to relate the presser plate B and platen C is adapted to guide and to angularly shift the platen to an inclined position when it is lifted by the operating means D. As shown, the positioning means E involves a stop 45 engageable with the rear edge portion of the platen C to limit upward movement thereof. In practice, the rear edge portion of the platen C is permitted to lift a short distance above the pressure plate B where it is stopped so that continued upward movement of the rod 37 causes the platen to tilt, as shown, and so that the front edge portion thereof is raised substantially higher than the rear edge portion. The stop 45 involves an arm 46 that is carried by the frame A and which has a portion overlying the rear edge portion of the platen C. The overlying portion of the arm 46 is bifurcated, or it has a slotted opening 47 therein that extends forwardly. The stop 45 also involves a guide 48 that is carried by the platen to project upward from the rear edge portion thereof. The guide 48 is engaged in the slot-shaped opening 47 to prevent turning of the platen C, and there is a stop pin 49 carried by and projecting laterally of the guide to engage the underside of the arm 46. A spring 50 normally yieldingly urges the guide upwardly by engaging under a head on the upper end of the guide, to the end that the platen is leveled as it reaches the down position. The guide 48 is preferably an elongate element threadedly carried in the platen and has a manually turnable knob for vertical adjustment as circumstances require.

The temperature controlling means X and Y are provided to govern the heat of the electrical heating elements 21 and 27 in the presser plate B and platen C, respectively. The means X and Y are simple thermostat controls as indicated in the diagram and are selectively adjustable to establish the desired heat in the plate B and platen C, respectively. In carrying out the invention, the presser plate B operates at a substantially higher heat level than the plate C. For example, the presser plate is set to operate at about 240° in which case the platen is set to operate at about 160° F. Due to this differential in heat between the two plate-like parts the film 11, above referred to, is caused to flow into the interstices within the fabric panel 12 while the facing 10 is also heated so that it does not subtract from the effective heating of the film 11.

Further, in order to operate the machine of the present invention, I provide a selectively variable timer Z controlling operation of a pressure and exhaust valve 51. The action of the timer Z is initiated by simultaneous closing of a pair of series switches 52 and holds the valve 51 open by means of a solenoid. A pressure regulator 53 is in the pressure line to the valve 51 so that the desired force can be applied as circumstances require. It is to be understood that the timer Z can vary widely, that is, it may be pneumatic or electrical, as desired.

In FIG. 3 of the drawings I have illustrated electrical heating elements 21 and 27 that are each a unit of construction. Each of said heating units is a bar-like element with a flat face adapted to have engagement against the inner surface of the plate forming the top or bottom of the plate B and platen C, as the case may be. As shown, a plurality of heating conductors extend through each of the heating elements and said elements are clamped in place by means of backing-bars 65, which are elongate bars coextensive with the heating elements. The bars 65 are held in place by means of screw fasteners or the like (not shown), and filler-blocks 66 of heat insulating material are placed between and behind the heating elements, so that only the active surfaces of the presser plate B and platen C are heated to any degree.

From the foregoing it will be apparent that I have provided an apparatus or machine that is easily operated. It is a simple matter to place a panel of fabric 12 upon the presser plate B and to superimpose thereon a label of the type above described. Upon manual operation of the two switches 52 the timer is put into operation opening the valve 51 to actuate the piston 36 and rod 37. The rod 37 moves downward on the vertical axis of the means D and shifts the platen C out of engagement with the stop 45 of the means E and into pressured engagement with the presser plate B. When the two plate-like parts come together, the greater level of heat in the lower presser plate B causes the drawing of the bonding material into the interstices in the lower fabric panel 12. Sufficient heat, however, is applied by the upper platen so as not to detract from the effectiveness of the operation, but without adversely effecting the facing 10. If it is found that there is discoloring of the label facing 10 or if there is found to be a running of the film 11 into the fabric of the facing or around the facing, then the temperature of the presser plate B can be increased somewhat. After a preset length of time, the timer releases the valve 51 and the spring 41 raises the platen and the positioning means E lifts the front edge portion thereof to make removal of the finished article most convenient.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A pressing machine for labels having a fabric facing and an underlying film of bonding material adapted to be softened by the application of heat for adhesion onto a panel of fabric, and including, a frame, a presser plate to support the panel of fabric and a platen carried by the frame and opposed to and shiftable toward the presser plate to engage the label, means heating the presser plate and means heating the platen, said heat level of the presser plate being substantially greater than the heat level of the platen whereby the bonding material flows only into the interstices in said panel of fabric, and means yieldingly urging the presser plate and platen into pressured engagement with the label therebetween.

2. A pressing machine for labels having a fabric facing and an underlying film of bonding material adapted to be softened by the application of heat for adhesion onto a panel fabric, and including, a frame having a base and with a standard carrying an arm that overlies the base, a presser plate to support the panel of the fabric and fixed on the base, a platen supported by the arm and opposed to and shiftable relative to the presser plate to engage the label thereon, means heating the presser plate and means heating the platen, said heat level of the presser plate being substantially greater than the heat level of the platen whereby the bonding material flows only into the interstices in said panel of fabric, and means yieldingly urging the presser plate and platen into pressured engagement with the label therebetween.

3. A pressing machine for labels having a fabric facing and an underlying film of bonding material adapted to be softened by the application of heat for adhesion onto a panel fabric, and including, a frame having a base and with a standard carrying an arm that overlies the base, a presser plate to support the panel of fabric and fixed on the base, a platen supported by the arm and opposed to and shiftable relative to the presser plate to engage the label thereon, means heating the presser plate and means heating the platen, said heat level of the presser plate being substantially greater than the heat level of the platen whereby the bonding material flows only into the interstices in said panel of fabric, means carried by the arm and yieldingly urging the presser plate and platen into pressured engagement and including a reciprocating element movable toward the presser plate, said platen being pivotally balanced on said reciprocating element, and means angularly positioning the platen relative to the presser plate when they are apart and including a vertically adjustable stop part on the frame engageable with one side portion of the platen to limit upward movement thereof and whereby the platen is pivoted and the opposite side portion of the platen is lifted higher than the first mentioned side portion.

References Cited in the file of this patent

UNITED STATES PATENTS

| | | |
|---|---|---|
| 1,942,254 | McGowan | Jan. 2, 1934 |
| 2,431,943 | Land | Dec. 2, 1947 |
| 2,686,552 | Faeber | Aug. 17, 1954 |
| 2,743,853 | McLogan | May 1, 1956 |
| 2,790,478 | Shapiro | Apr. 30, 1957 |